UNITED STATES PATENT OFFICE.

THOMAS LEES BARTLESON, OF WILMINGTON, DELAWARE, ASSIGNOR TO E. I. DU PONT DE NEMOURS & COMPANY, OF WILMINGTON, DELAWARE, A CORPORATION OF DELAWARE.

PROCESS OF MAKING PHOSPHORUS OXYCHLORID.

1,381,783.  Specification of Letters Patent.  Patented June 14, 1921.

No Drawing.  Application filed October 21, 1920. Serial No. 418,575.

*To all whom it may concern:*

Be it known that I, THOMAS LEES BARTLESON, a citizen of the United States, and a resident of Wilmington, in the county of New Castle and State of Delaware, have invented a certain new and useful Process of Making Phosphorus Oxychlorid, of which the following is a specification.

This invention relates to the production of phosphorus oxychlorid, and comprises treating metaphosphoric acid with phosgen at a high temperature.

I have discovered that if phosgen be brought into contact with meta-phosphoric acid at a temperature of, say, between 300 and 400° C. a reaction occurs in accordance with the following equation:—

$$HPO_3 + 2COCl_2 = POCl_3 + HCl + 2CO_2,$$

the reaction being readily carried to completion.

The invention may be illustrated by the following example:—

Orthophosphoric acid was heated until it was transformed into metaphosphoric acid and maintained at a temperature of 330–340° C. Pure phosgen was then bubbled through the molten acid when phosphorus oxychlorid was formed, distilled off and condensed.

I claim:—

1. The process of producing phosphorus oxychlorid which comprises bringing phosgen into contact with molten metaphosphoric acid.

2. The process of producing phosphorus oxychlorid which comprises passing phosgen into molten meta-phosphoric acid at a temperature between about 300 and 400° C.

3. The process of producing phosphorus oxychlorid which comprises passing phosgen into molten meta-phosphoric acid maintained at a temperature between 330 and 340° C.

In testimony whereof I affix my signature.

THOMAS LEES BARTLESON.